(12) United States Patent
Nishimura

(10) Patent No.: US 7,102,829 B2
(45) Date of Patent: Sep. 5, 2006

(54) ZOOM LENS SYSTEM AND IMAGE PICKUP DEVICE HAVING ZOOM LENS SYSTEM

(75) Inventor: Takeshi Nishimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/942,636

(22) Filed: Sep. 16, 2004

(65) Prior Publication Data

US 2005/0063069 A1    Mar. 24, 2005

(30) Foreign Application Priority Data

Sep. 19, 2003    (JP)    ............................. 2003-328074

(51) Int. Cl.
*G02B 15/14*    (2006.01)
(52) U.S. Cl. ...................... 359/686; 359/680
(58) Field of Classification Search ................ 359/686, 359/680–682
See application file for complete search history.

(56) References Cited

U.S. PATENT DOCUMENTS

| 5,132,848 | A | | 7/1992 | Nishio et al. |
| 5,264,965 | A | | 11/1993 | Hirakawa |
| 5,585,970 | A | | 12/1996 | Shibayama |
| 5,663,835 | A | | 9/1997 | Shibayama ................ 359/684 |
| 5,835,272 | A | * | 11/1998 | Kodama ..................... 359/557 |
| 6,320,698 | B1 | | 11/2001 | Suzuki ....................... 359/557 |
| 6,639,721 | B1 | * | 10/2003 | Endo .......................... 359/566 |
| 6,710,931 | B1 | | 3/2004 | Misaka ...................... 359/686 |
| 6,809,880 | B1 | * | 10/2004 | Murata ...................... 359/686 |

FOREIGN PATENT DOCUMENTS

| JP | 57-11315 | 1/1982 |
| JP | 58-95315 | 6/1983 |
| JP | 59-229517 | 12/1984 |
| JP | 60-55313 | 3/1985 |
| JP | 60-87312 | 5/1985 |
| JP | 61-62013 | 3/1986 |
| JP | 61-123811 | 6/1986 |
| JP | 62-63909 | 3/1987 |
| JP | 2-136812 | 5/1990 |
| JP | 4-163415 | 6/1992 |
| JP | 4-235515 | 8/1992 |
| JP | 5-19170 | 1/1993 |
| JP | 5-313065 | 11/1993 |
| JP | 6-82698 | 3/1994 |
| JP | 7-287168 | 10/1995 |
| JP | 2629904 | 4/1997 |
| JP | 2000-338397 | 12/2000 |

* cited by examiner

*Primary Examiner*—Jordan M. Schwartz
(74) *Attorney, Agent, or Firm*—Morgan&Finnegan,L.L.P.

(57) ABSTRACT

To realize a zoom lens system, including, in order from an object side to an image side: a first lens unit having a negative optical power; a second lens unit having a positive optical power; a third lens unit having a negative optical power; and a fourth lens unit having a positive optical power, in which: during zooming, an interval between the first lens unit and the second lens unit at a telephoto end is smaller than that at a wide angle end, an interval between the second lens unit and the third lens unit at the telephoto end is larger than that at the wide angle end, and an interval between the third lens unit and the fourth lens unit at the telephoto end is smaller than that at the wide angle end; and specific conditions are satified.

14 Claims, 11 Drawing Sheets

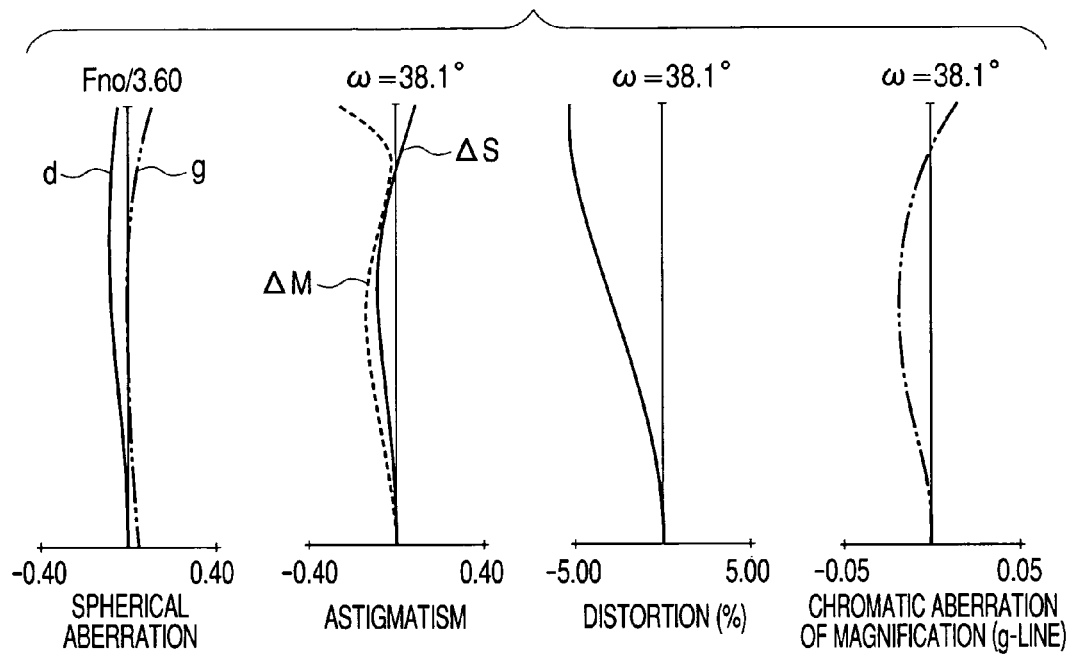
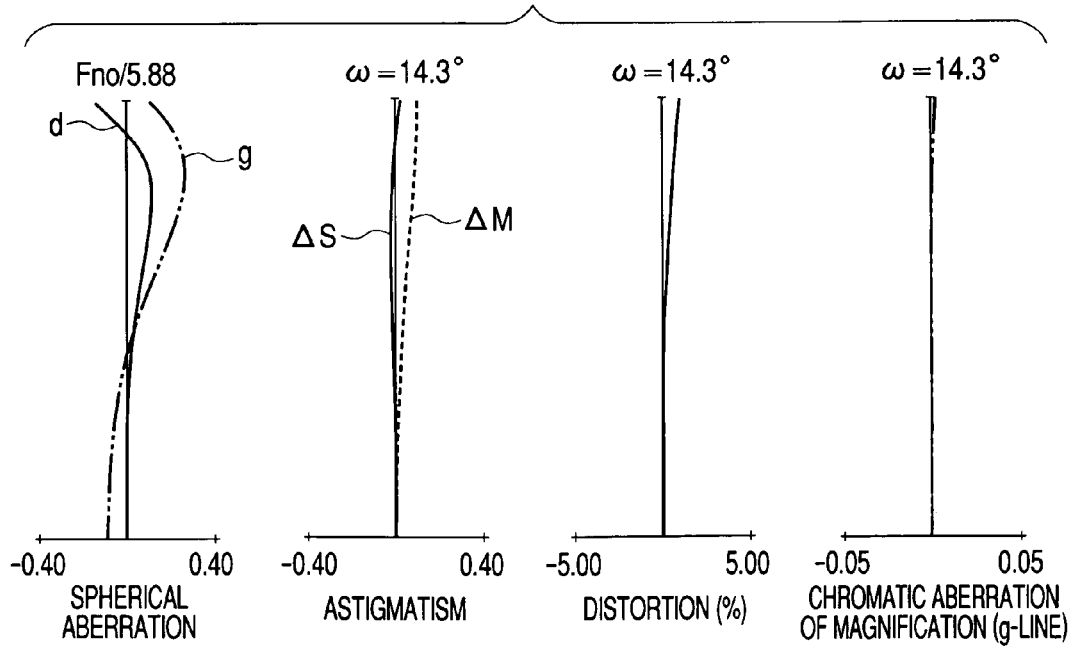

ZOOM LENS SYSTEM AND IMAGE PICKUP DEVICE HAVING ZOOM LENS SYSTEM

BACKGROUND OF THE INVENTION

1. Field of the Invention

The present invention relates to a zoom lens system, and more particularly to a zoom lens system suitable for a silver halide film camera, an electronic recording type digital still camera, an electronic recording type video camera, or the like.

2. Related Background Art

A so-called negative lead type zoom lens, in which a lens unit having a negative refractive power, is disposed on its front side has been used for a wide angle zoom lens in many cases, since it has characteristics of: "a distance for close-up image pickup is relatively short", "a field angle can be relatively easily widened", "a back focus can be relatively easily lengthened", and the, like.

On the other hand, in the negative lead type zoom lens, at a telephoto end, a first and a second lens units consist a positive group and a third and a fourth lens units consist a negative group, so that the entire optical system can be used as a so-called telephoto type. Therefore, there is a merit in that a focal length can easily be lengthened even on the telephoto end.

A zoom lens is disclosed in, for example, Japanese Patent Application Laid-open Nos. S57-011315, S58-095315, S59-229517, S60-055313, S60-087312, S61-062013, S61-123811, S62-063909, H02-136812, H04-235515, H04-163415 (corresponding to U.S. Pat. No. 5,132,848 B), H05-019170 (corresponding to U.S. Pat. No. 5,264,965 B), H05-313065, H06-082698, H07-287168 (corresponding to U.S. Pat. No. 5,585,970 B), Japanese Patent Application No. 2000-338397, and JP 2629904 B (specification). The zoom lens includes four lens units having negative, positive, negative, and positive refractive powers, in order from the object side to the image side. Zooming is performed by moving at least two lens units of these four lens units.

A zoom lens for single-lens reflex digital camera requires a further improvement in image quality as compared with conventional zoom lenses for silver halide film camera.

In general, when the refractive power of each of the lens units is increased in a zoom lens, the moving amount of each of the lens units necessary for obtaining a predetermined zoom ratio reduces. Therefore, it is possible to widen the field angle while the length of the entire lens system is shortened. However, when the refractive power of each of the lens units is merely increased, a variation in aberration with zooming becomes larger. In particular, when a wide field angle is to be obtained, it is hard to obtain preferable optical performance over the entire zoom range.

When an ultra wide field angle is set, it is hard to correct astigmatism. Therefore, there has been such a tendency that high performance cannot be obtained or a size of the zoom lens increases.

SUMMARY OF THE INVENTION

The present invention has been made in view of the above-mentioned circumstances in the conventional zoom lens. An object of the present invention is to provide a small size zoom lens system having high optical performance over an entire zoom range with a wide field angle.

In order to solve the above-mentioned problems, an illustrated zoom lens system of the present invention includes a first lens unit having a negative refractive power (optical power=a reciprocal of a focal length), a second lens unit having a positive refractive power, a third lens unit having a negative refractive power, and a fourth lens unit having a positive refractive power in order from the object side to the image side. Upon zooming, at a telephoto end as compared with a wide angle end, an interval between the first lens unit and the second lens unit reduces, an interval between the second lens unit and the third lens unit increases, and an interval between the third lens unit and the fourth lens unit reduces. A zoom ratio is about 2.5 to 4.0. A back focus to a maximum image height and a distance between a lens plane closest to the object side and a lens plane closest to the image side at the wide angle end are set to suitable values.

BRIEF DESCRIPTION OF THE DRAWINGS

FIG. 8 is an aberration graph of the zoom lens at wide angle end, according to Numerical Embodiment 3;

FIG. 9 is an aberration graph of the zoom lens at telephoto end, according to Numerical Embodiment 3;

DETAILED DESCRIPTION OF THE PREFERRED EMBODIMENT

Hereinafter, a zoom lens system and an image pickup device having the zoom lens system according to an embodiment of the present invention will be described with reference to the drawings.

Figure 1:
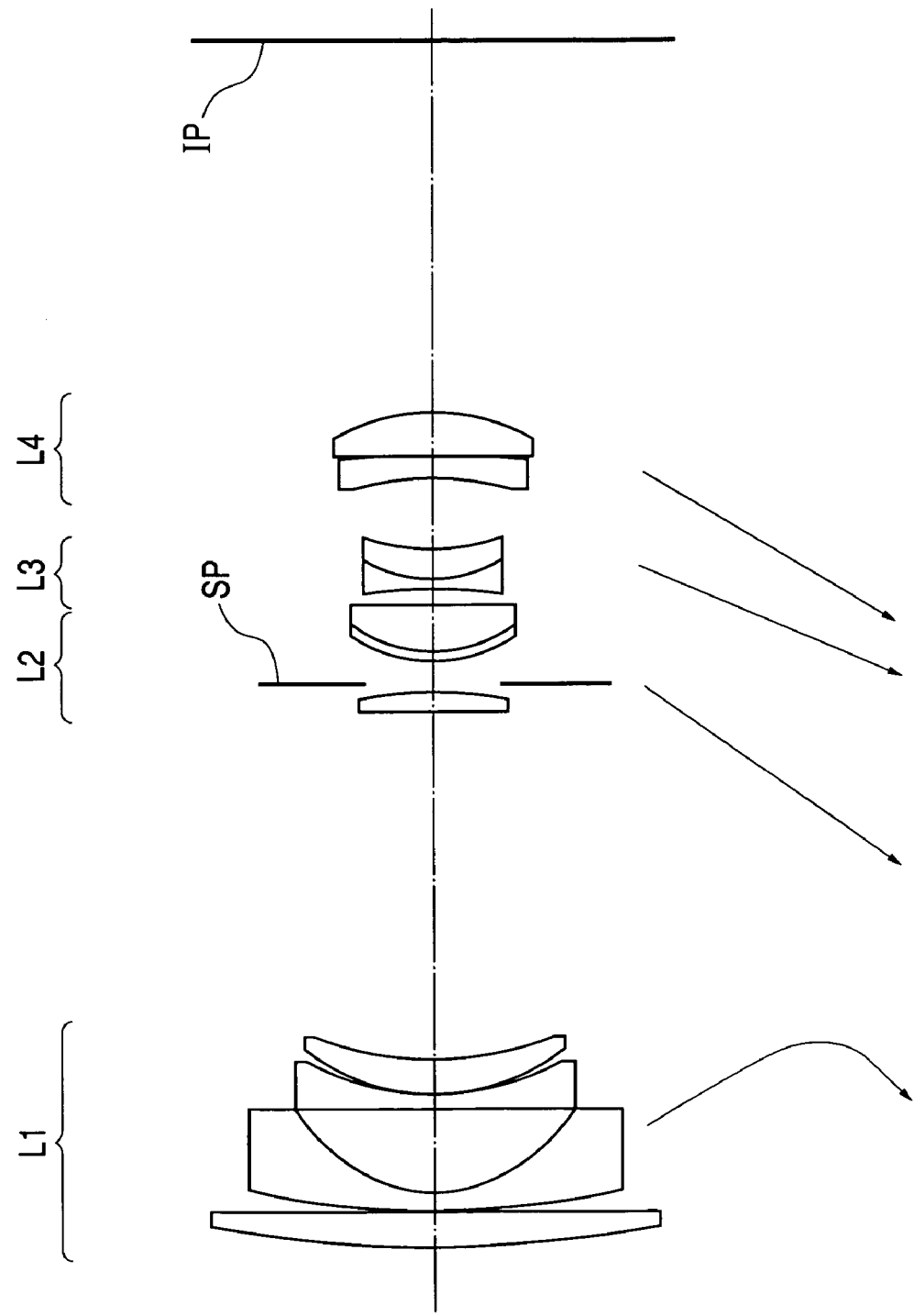
FIG. 1 is a lens sectional view showing a zoom lens at wide angle end, according to Numerical Embodiment 1.
Figure 2:
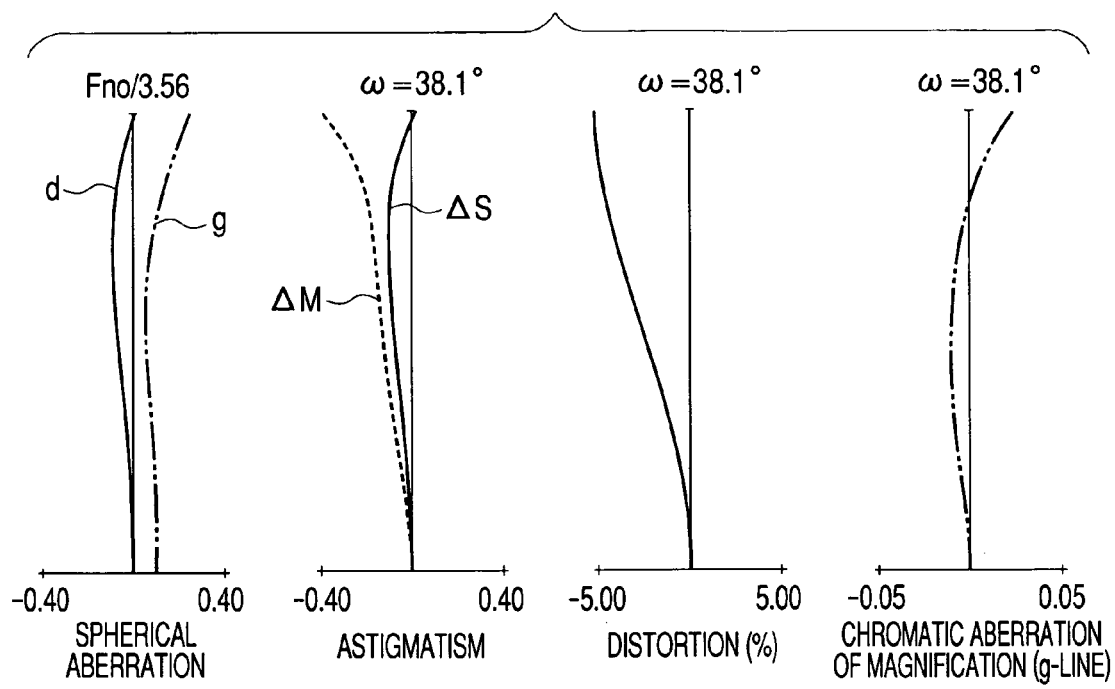
FIG. 2 is an aberration graph of the zoom lens at wide angle end, according to Numerical Embodiment 1.
Figure 3:
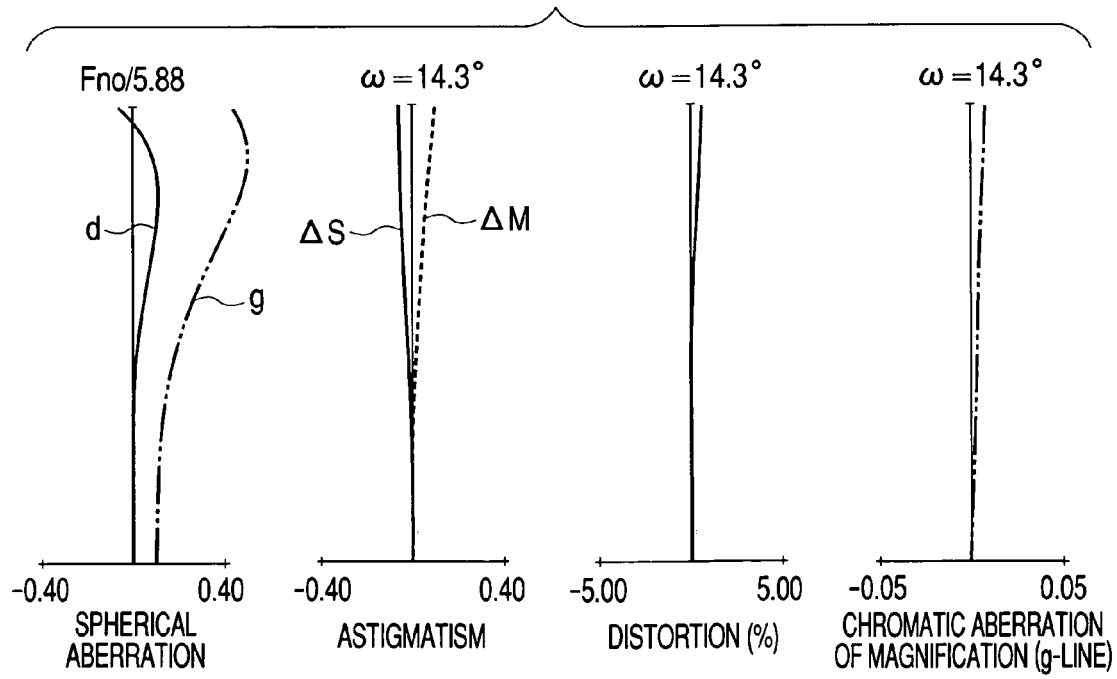
FIG. 3 is an aberration graph of the zoom lens at telephoto end, according to Numerical Embodiment 1.
Figure 4:
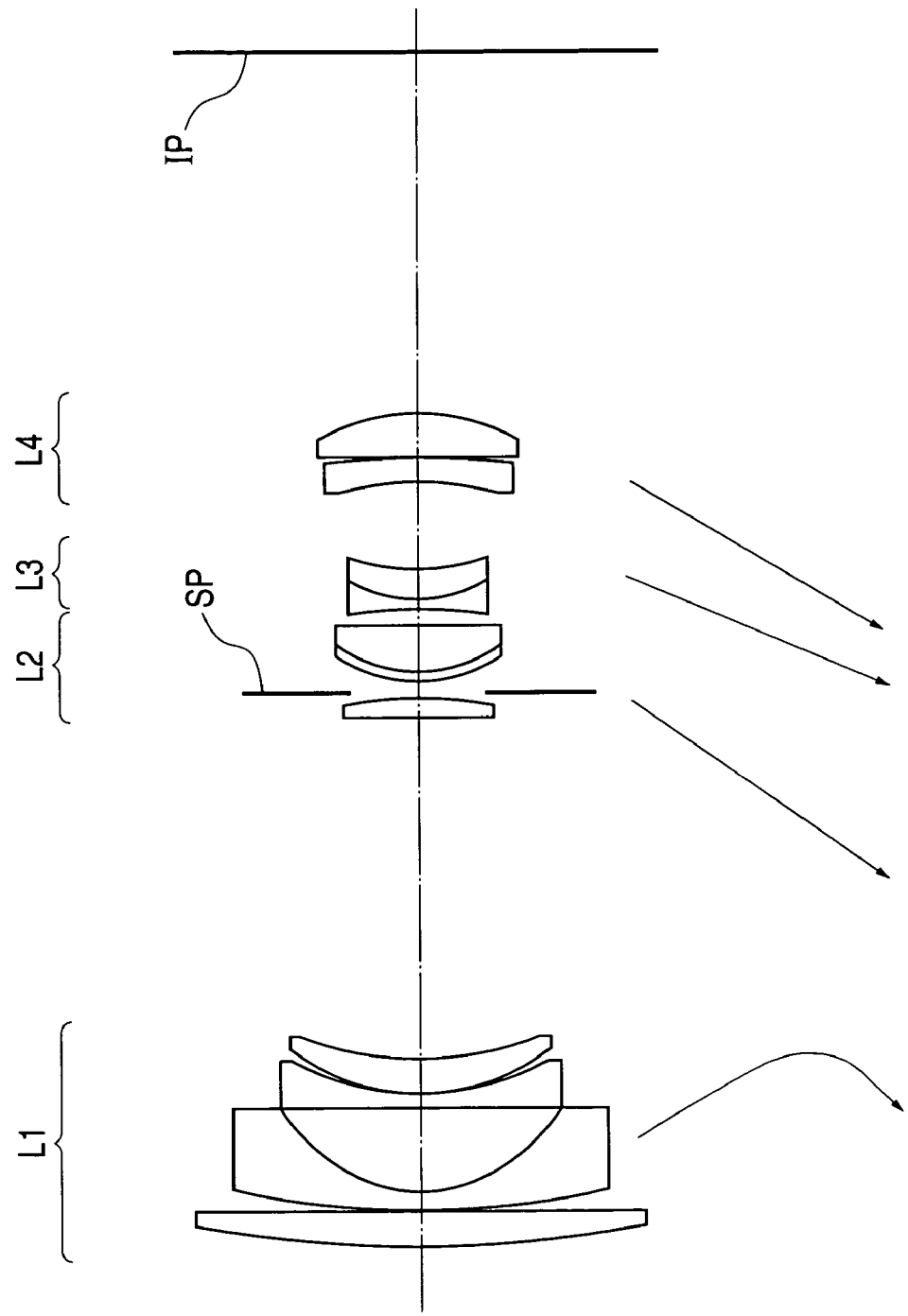
FIG. 4 is a lens sectional view showing a zoom lens at wide angle end, according to Numerical Embodiment 2.
Figure 5:
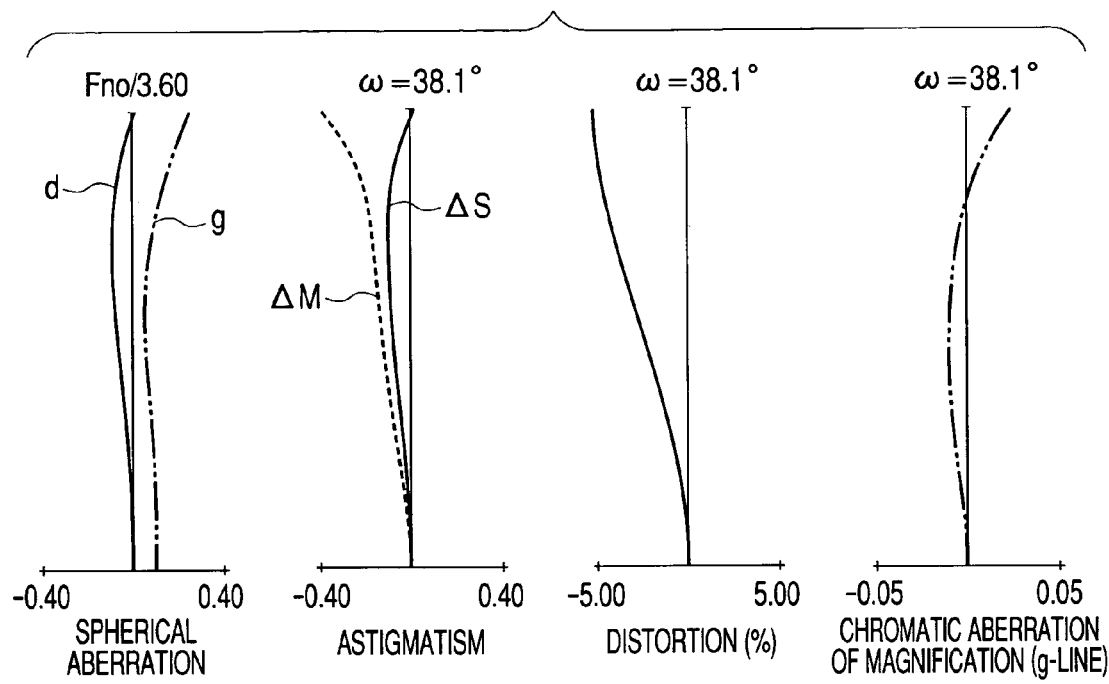
FIG. 5 is an aberration graph of the zoom lens at wide angle end, according to Numerical Embodiment 2.
Figure 6:
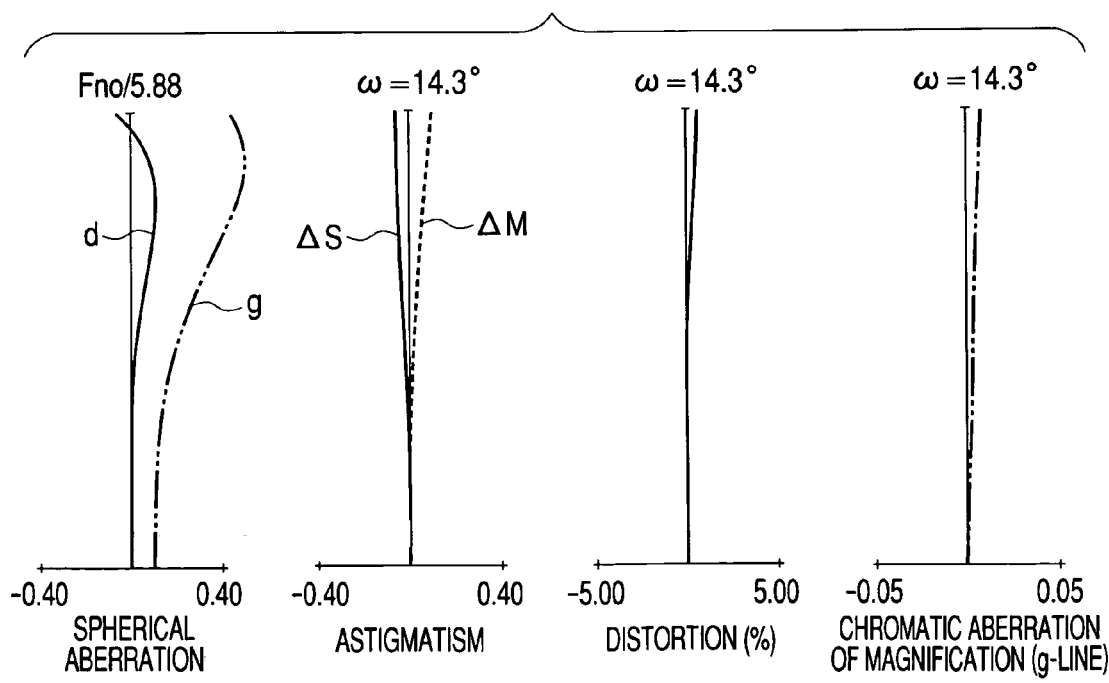
FIG. 6 is an aberration graph of the zoom lens at telephoto end, according to Numerical Embodiment 2.
Figure 7:
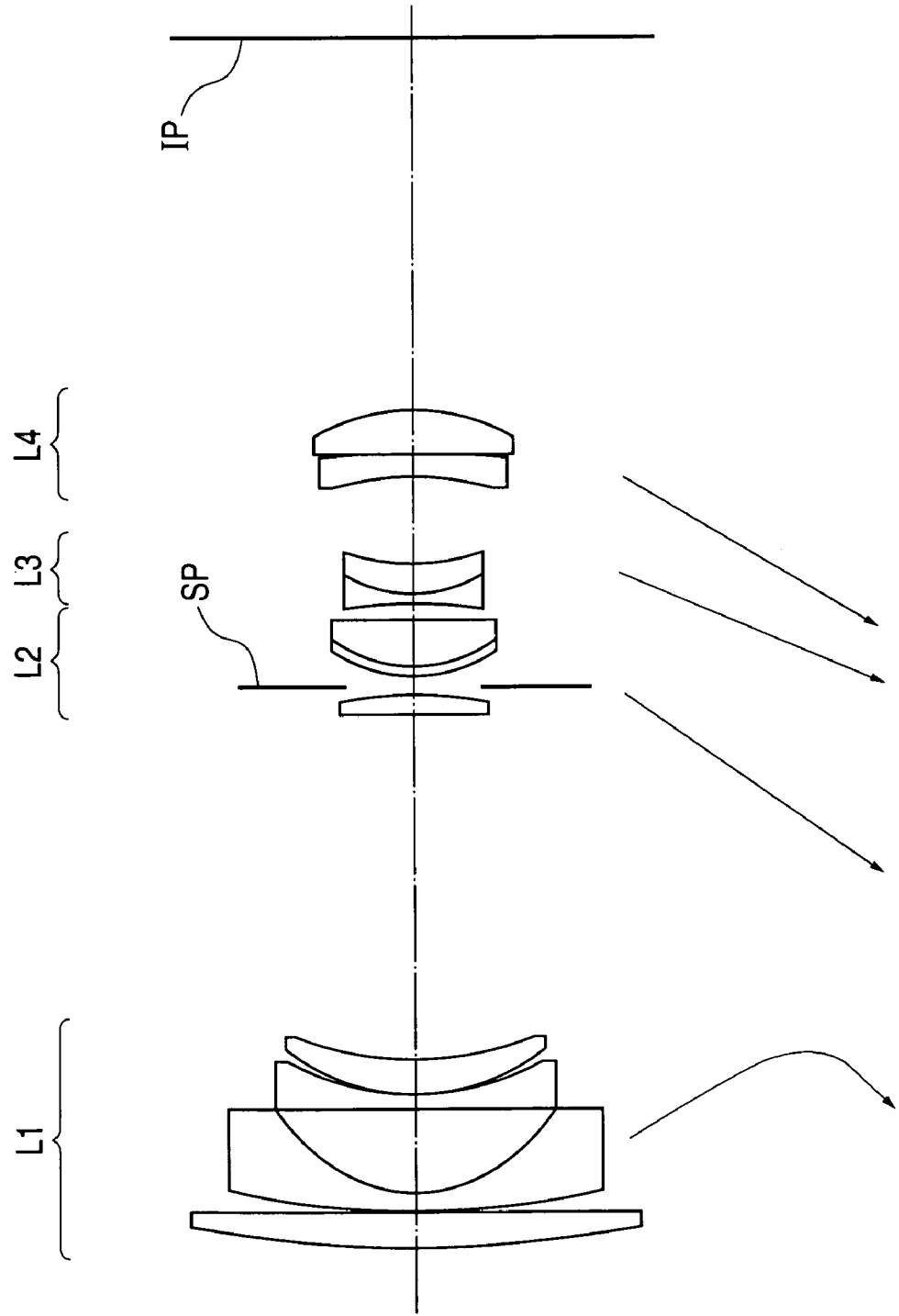
FIG. 7 is a lens sectional view showing a zoom lens at wide angle end, according to Numerical Embodiment 3.
Figure 10:
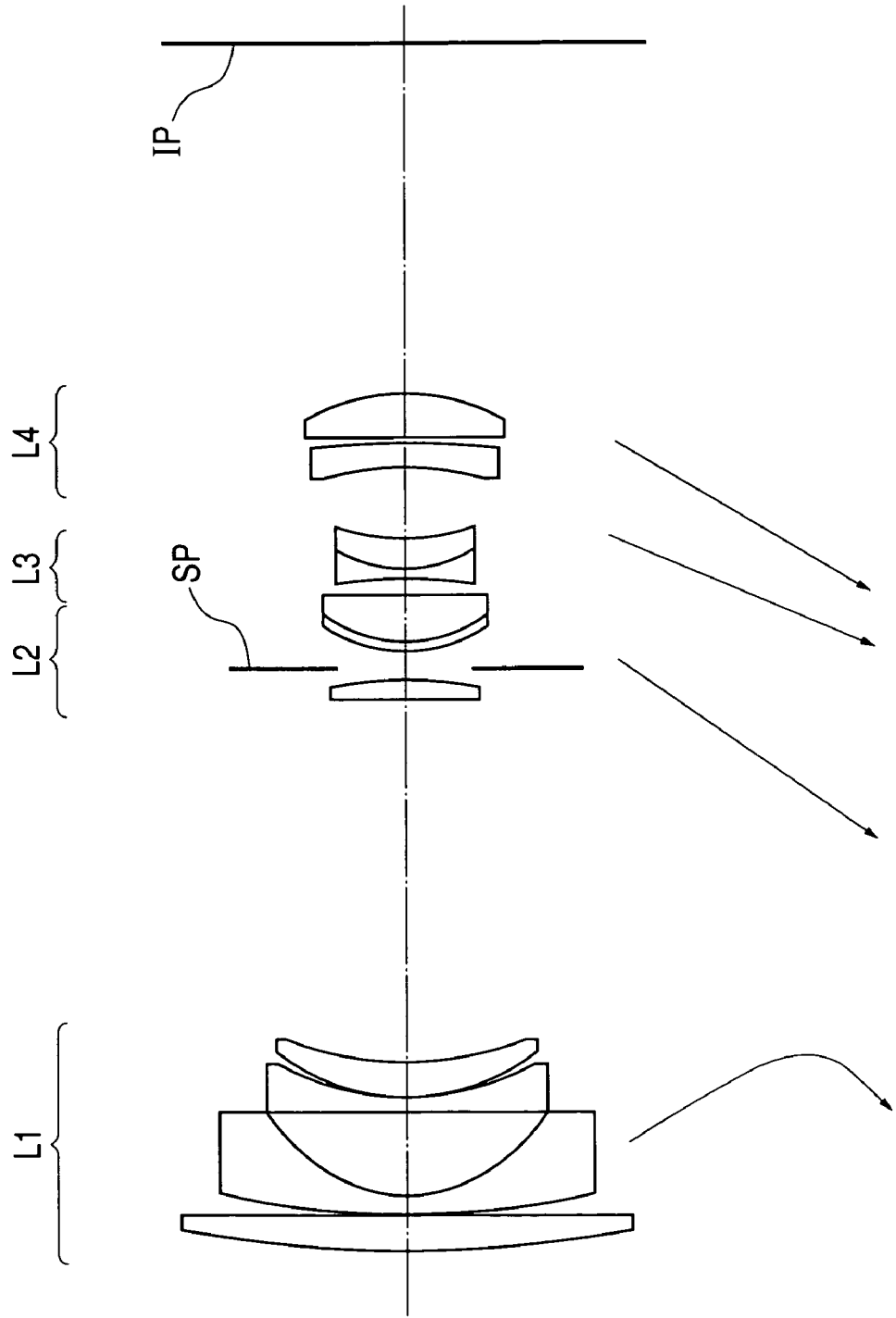
FIG. 10 is a lens sectional view showing a zoom lens at wide angle end, according to Numerical Embodiment 4.
Figure 11:
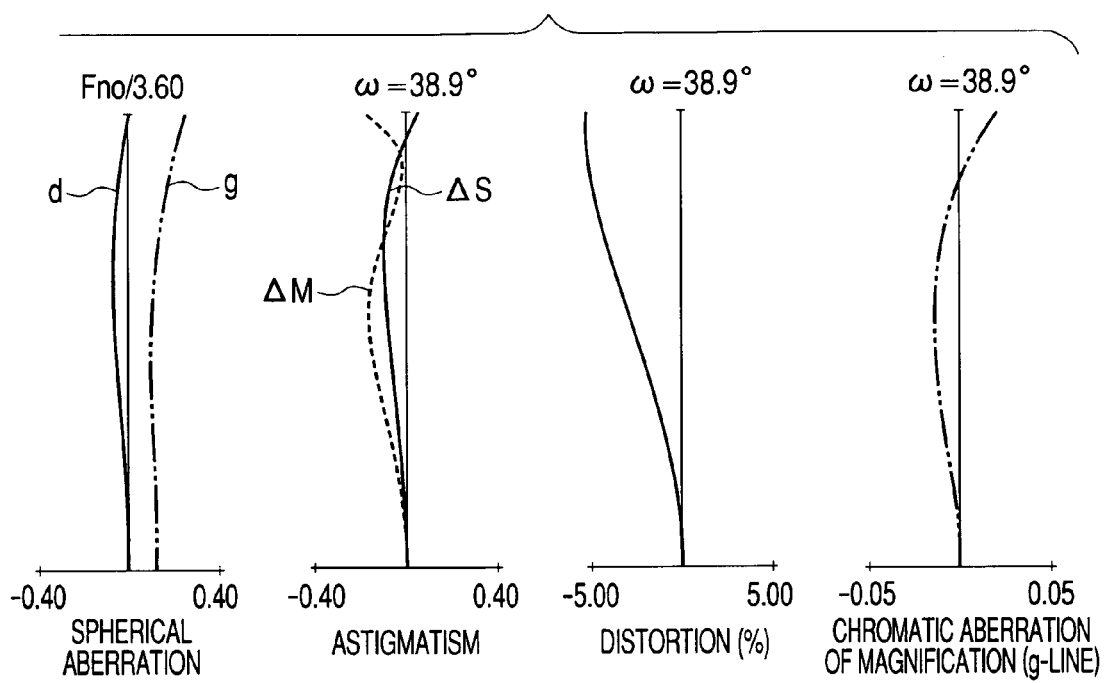
FIG. 11 is an aberration graph of the zoom lens at wide angle end, according to Numerical Embodiment 4.
Figure 12:
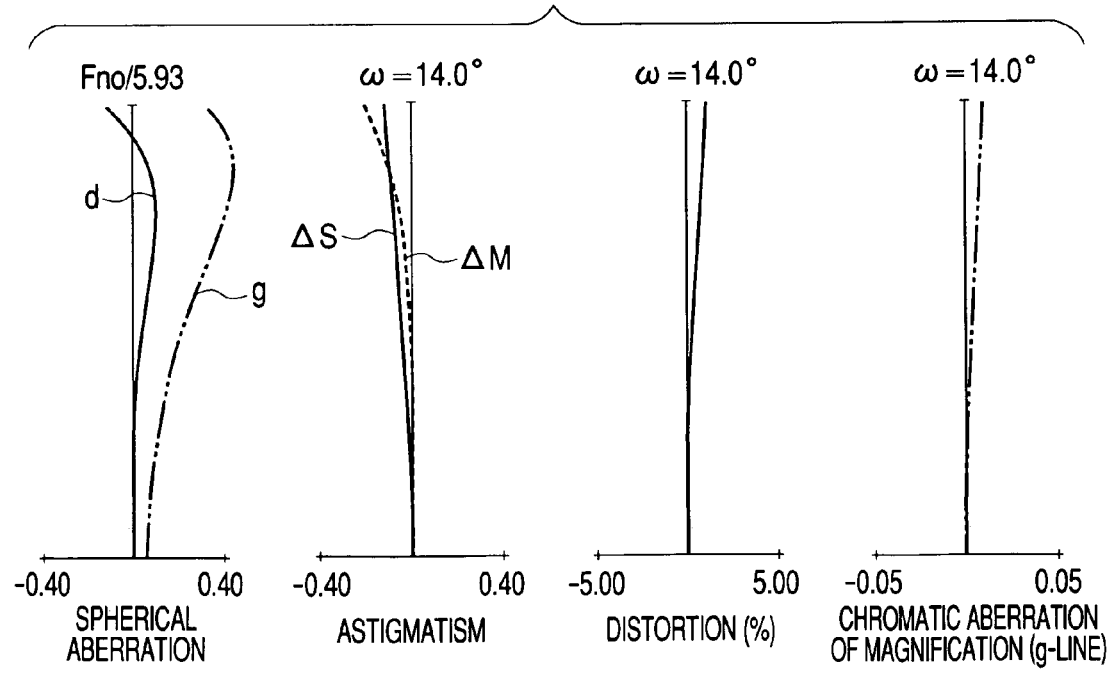
FIG. 12 is an aberration graph of the zoom lens at telephoto end, according to Numerical Embodiment 4.
Figure 13:
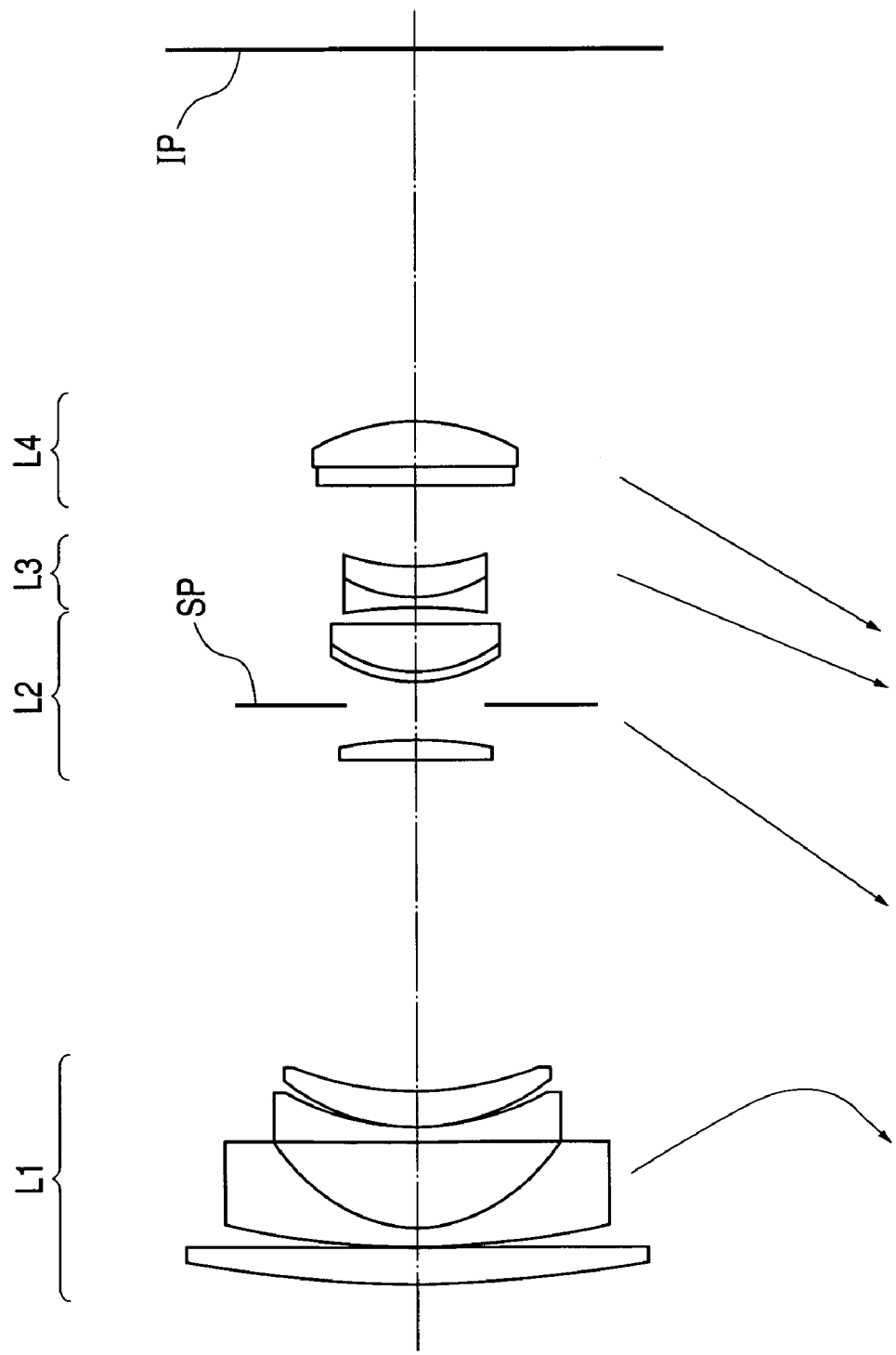
FIG. 13 is a lens sectional view showing a zoom lens at wide angle end, according to Numerical Embodiment 5.
Figure 14:
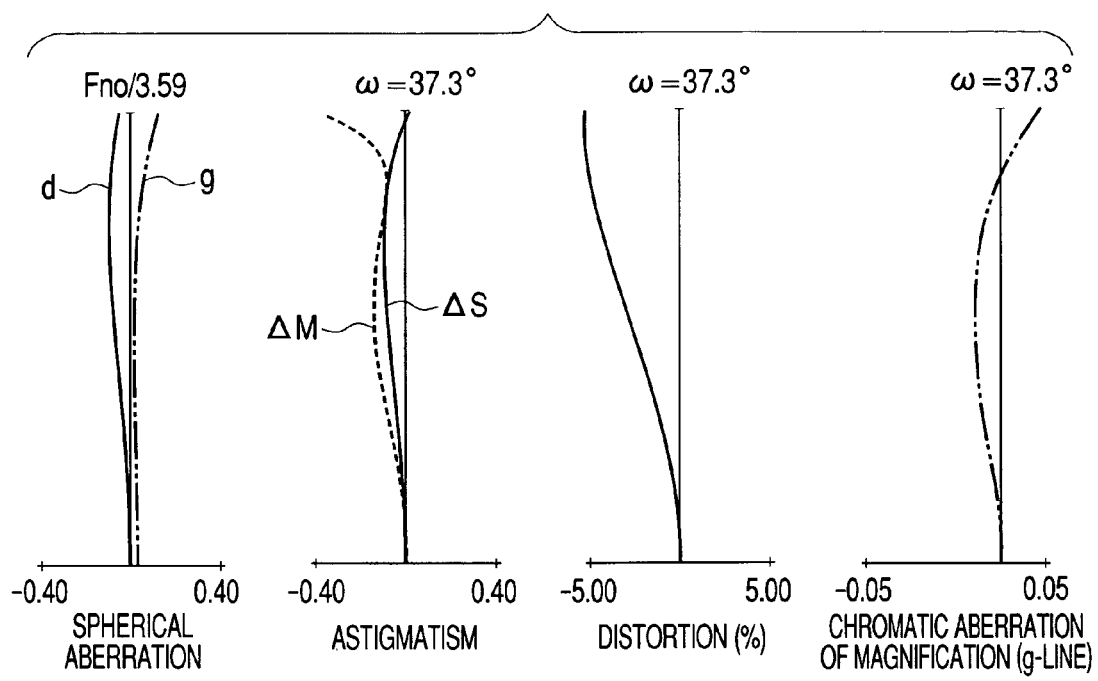
FIG. 14 is an aberration graph of the zoom lens at wide angle end, according to Numerical Embodiment 5.
Figure 15:
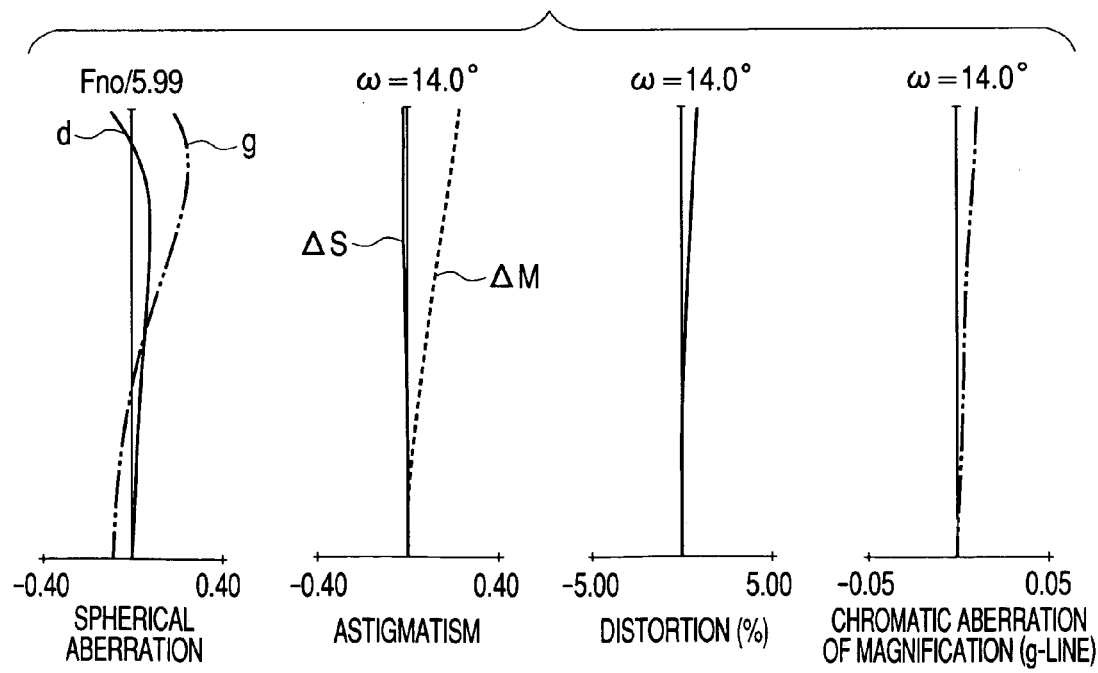
FIG. 15 is an aberration graph of the zoom lens at telephoto end, according to Numerical Embodiment 5.

FIGS. 1, 4, 7, 10, and 13 are lens sectional views showing a zoom lens at a wide angle end, according to Numerical Embodiments 1 to 5 (hereinafter collectively called "this embodiment") described later, respectively. FIGS. 2 and 3 are various aberration graphs of the zoom lens at wide angle end and telephoto end according to Numerical Embodiment 1. FIGS. 5 and 6 are various aberration graphs of the zoom lens at wide angle end and telephoto end according to Numerical Embodiment 2. FIGS. 8 and 9 are various aberration graphs of the zoom lens at wide angle end and telephoto end according to Numerical Embodiment 3. FIGS. 11 and 12 are various aberration graphs of the zoom lens at wide angle end and telephoto end according to Numerical Embodiment 4. FIGS. 14 and 15 are various aberration graphs of the zoom lens at wide angle end and telephoto end, according to Numerical Embodiment 5.

The zoom lens according to this embodiment is an image pickup lens system used for an image pickup device such as a single-lens reflex camera, or the like. In the lens sectional views, the left is an object side (front) and the right is an image side (rear).

In the lens sectional views, reference L1 denotes a first lens unit having a negative refractive power (optical power=the reciprocal of a focal length), L2 denotes a second lens unit having a positive refractive power, L3 denotes a third lens unit having a negative refractive power, and L4 denotes a fourth lens unit having a positive refractive power. Reference SP denotes an aperture stop, which is disposed in the second lens unit L2. Reference IP denotes an image plane where a photosensitive surface of a silver halide film or a solid-state image pickup element (photoelectric transducer) such as a CCD sensor or a CMOS sensor is disposed.

In the zoom lens according to this embodiment, the respective lens units are moved for zooming from wide angle end to telephoto end, so as to reduce an axial interval between the first lens unit L1 and the second lens unit L2, to increase an axial interval between the second lens unit L2 and the third lens unit L3, and to reduce an axial interval between the third lens unit L3 and the fourth lens unit L4. As shown by arrows in the lens sectional views, the second lens unit L2, the third lens unit L3, and the fourth lens unit L4 are moved for magnification toward the object side. The first lens unit L1 is moved along a locus which is convex to the image side, thereby compensating a variation in image plane, which is caused by the magnification. Note that the second lens unit L2 and the fourth lens unit L4 are integrally moved during zooming without change in those relative positions (axial interval therebetween), thereby simplifying a moving mechanism.

Focusing on from an object at infinity to an object at a close point is performed by moving the first lens unit L1 toward the object side. The focusing using the first lens unit L1 is preferable because the amount of operation according to an object distance is kept substantially constant in a range from the wide angle end to the telephoto end, thereby simplifying the moving mechanism. In the zoom type according to this embodiment, the second lens unit L2 is unsuitable as a focusing unit because paraxial lateral magnification becomes equal magnification during zooming. In the case where the third lens unit L3 or the fourth lens unit L4 is used as the focusing unit, when an interval between the respective lens units is widened to ensure the amount of movement, a size of the lens system increases. And it is not preferable because the number of lenses increases in order to suppress a variation in aberration during focusing.

In the zoom type according to this embodiment, a back focus (in axial distance between a surface vertex of a final lens surface and a paraxial image plane) becomes the shortest at wide angle end. Therefore, in order to ensure a back focus, it is necessary to provide a refractive power arrangement in which an image side principal point is located closer to the image side at wide angle end. In order to locate the image side principal point closer to the image side, a so-called retrofocus (inverted telephoto) type, in which a negative refractive power component is located on the object side and a positive refractive power component is located on the image side, may be used.

In this embodiment, the second lens unit L2, the third lens unit L3, and the fourth lens unit L4, in which a composite refractive power is positive, are arranged apart from the first lens unit L1 having the negative refractive power at the wide angle end. Even in a partial system which is composed of the second lens unit L2, the third lens unit L3, and the fourth lens unit L4, the third lens unit L3 having the negative refractive power is located as close as possible to the object side in the partial system so as to locate the image side principal point closer to the image side. By suitably arranging the respective lens units at the wide angle end, the zoom lens according to this embodiment ensures a sufficient back focus in the entire system.

On the other hand, in order to shorten the lens length of the entire system, it is preferable that the respective lens units be arranged at the telephoto end so as to locate the image side principal point closer to the object side. To locate the image side principal point closer to the object side, a so-called telephoto type, in which a positive refractive power component is located on the object side and a negative refractive power component is located on the image side, may be used. In this embodiment, at the telephoto end, the first lens unit L1 and the second lens unit L2 are made close to each other to compose a partial system having a positive composite refractive power and the third lens unit L3 and the fourth lens unit L4 are made close to each other to compose a partial system having a negative composite refractive power. By suitably arranging the respective lens units at the telephoto end as described above, the entire optical length of the zoom lens according to this embodiment at the telephoto end is shortened.

One of the features of the zoom lens disclosed in this embodiment is that the following conditional expressions (1) and (2) are simultaneously satisfied. Therefore, a desirable back focus is ensured with a state in which a suitable balance is achieved between optical performance and a zoom ratio in the zoom lens composed of the four units.

$$2.5 < ft/fw < 4.0 \tag{1}$$

$$2.2 < bfw/H < 3.0 \tag{2}$$

where fw: a focal length of the entire system at the wide angle end ft: a focal length of the entire system at the telephoto end bfw: a back focus at the wide angle end H: a maximum image height The conditional expression (1) relates to a ratio between the focal length of the entire system at the wide angle end and the focal length of the entire system at the telephoto end. The conditional expression (1) specifies a zoom ratio (magnification ratio) best suitable for the structure of the zoom lens of the present invention. When the zoom ratio becomes smaller than a lower limit value in the conditional expression (1), the zoom ratio can be realized even in the case of the zoom lens composed of two units. Therefore, it is useless to construct the zoom lens using the four lens units (advantage obtained from the four-unit structure cannot be improved). On the other hand, when the zoom ratio exceeds an upper limit value in the conditional expression (1), in order to ensure an axial interval between the first lens unit L1 and the second lens unit L2 at the telephoto end, it is necessary to locate the first lens unit L1 closer to the object side at the wide angle end. Therefore, an effective diameter of the first lens unit L1 increases and it becomes hard to correct coma aberration and distortion, with the result that high optical performance cannot be obtained.

Note that it is more preferable to set the lower limit value in the conditional expression (1) to 2.8. The upper limit value is more preferably set to 3.5.

The conditional expression (2) relates to a ratio between the maximum image height and the back focus at the wide angle end, and is used to sufficiently ensure a desirable back focus.

When the ratio becomes smaller than a lower limit value in the conditional expression (2), the back focus becomes shorter for the maximum image height. Therefore, the ratio is not suitable for an optical device that requires a predetermined back focus such as an image pickup lens for a single-lens reflex digital camera. Further, because an exit pupil position becomes closer to an image, the ratio is not suitable for a camera using a solid-state image pickup element that requires telecentricity to the image side. On the other hand, when the zoom ratio exceeds an upper limit value in the conditional expression (2), the entire lens length at the wide angle end lengthens and the effective diameter of the first lens unit L1 increases, so that the lens system becomes unbalanced. In addition, it is hard to correct the coma aberration and the distortion occurring in the first lens unit L1. Although the coma aberration and the distortion can be corrected using an aspherical lens, an increase in cost occurs.

Note that it is more preferable to set the lower limit value in the conditional expression (2) to 2.4. The upper limit value is more preferably set to 2.8.

Another feature of the zoom lens disclosed in this embodiment is to satisfy the following conditional expression (3) instead of the conditional expression (2), together with the conditional expression (1). Therefore, a small size zoom lens is realized in which a suitable balance is achieved between the optical performance and the zoom ratio in the zoom lens composed of the four units.

$$2.5 < ft/fw < 4.0 \tag{1}$$

$$4.1 < TDw/fw < 5.0 \tag{3}$$

where fw: a focal length of the entire system at the wide angle end ft: a focal length of the entire system at the telephoto end TDw: axial distance between a lens surface closest to the object side (first lens surface) and a lens surface closest to the image side (final lens surface) at the wide angle end The conditional expression (1) is as described above.

The conditional expression (3) relates to a ratio between a distance between the lens surface closest to the object side (object side surface of the lens closest to the object side) and the lens surface closest to the image side (image side surface of the lens closest to the image side) at the wide angle end and the focal length of the entire system at the wide angle end. The ratio is mainly used to achieve a balance between a reduction in size and the performance.

When the ratio becomes smaller than a lower limit value in the conditional expression (3) to shorten the entire lens length at the wide angle end, the refractive power of each of the lens units becomes so strong that it is hard to correct the respective aberrations. On the other hand, when the ratio exceeds an upper limit value in the conditional expression (3), the entire lens length lengthens and a lens effective diameter (in particular, the effective diameter of the first lens unit L1) increases.

Note that it is more preferable to set the lower limit value in the conditional expression (3) to 4.3. The upper limit value is more preferably set to 4.9.

The zoom lens according to this embodiment discloses an arrangement in which the conditional expressions (1) to (3) are simultaneously satisfied.

As described above, by simultaneously satisfying the conditional expressions (1) and (2) or the conditional expressions (1) and (3), a small size zoom lens system having high optical performance over the entire zoom range at a wide field angle is realized.

The zoom lens according to this embodiment satisfies the following conditions (A) to (D). Satisfying the conditions provides the effects described above.

(A) The first lens unit L1 has a positive lens closest to the object side. A condition $$-0.3 < R1/R2 < 0.3 \tag{4}$$

is satisfied, where R1 represents a curvature radius of an object side lens surface of the positive lens, and R2 represents a curvature radius of an image side lens surface thereof.

The zoom lens according to this embodiment is a lens having a back focus relatively longer for the maximum image height, so that the lens effective diameter of the first lens unit L1 can easily increase. Note that, at the wide angle end, it is hard to simultaneously correct the distortion and the coma aberration which are caused by the negative refractive power of the first lens unit L1. Therefore, the positive lens is located closest to the object side in the first lens unit L1 and the distortion is actively corrected using the positive lens, thereby correcting total distortion and the coma aberration in the first lens unit L1. The conditional expression (4) relates to a ratio between the curvature radius of the object side lens surface of the positive lens and the curvature radius of the image side lens surface thereof, and is mainly used to achieve a balance between the distortion and a reduction in size.

When the ratio becomes smaller than a lower limit value in the conditional expression (4), it is not preferable that, in particular, astigmatism at the wide angle end increases and the lens diameter lengthens. On the other hand, when the ratio exceeds an upper limit value in the conditional expression (4), an effect of the distortion on the image side lens surface of the positive lens reduces. Therefore, it is not preferable that the correction of the distortion at the wide angle end becomes insufficient. Note that it is more preferable to set the lower limit value in the conditional expression (4) to −0.1. The upper limit value is more preferably set to 0.15.

(B) A condition $$0.1 < (f1/ft)^2 < 0.5 \tag{5}$$

is satisfied, where f1 represents a focal length of the first lens unit L1.

The conditional expression (5) relates to a ratio between the focal length of the first lens unit L1 used as the focusing unit and the focal length of the entire system at the telephoto end, and is mainly used to reduce the size of the zoom lens.

When the ratio becomes smaller than a lower limit value in the conditional expression (5) and thus the refractive power of the first lens unit L1 becomes too strong, the distortion occurring in the first lens unit L1 increases. Thus, it is not preferable that it is hard to correct the distortion by the subsequent units. On the other hand, when the ratio exceeds an upper limit value in the conditional expression (5) and thus the refractive power of the first lens unit L1 becomes too weak, the amount of operation of the first lens unit L1 increases at focusing on a nearest object. In addition, the entire optical length at the wide angle end lengthens to increase the lens effective diameter of the first lens unit L1. Note that it is more preferable to set the lower limit value in the conditional expression (5) to 0.19. The upper limit value is more preferably set to 0.4.

(C) The second lens unit L2 includes a first lens sub-unit having a positive refractive power, the aperture stop SP, and a second lens sub-unit having a positive refractive power, which are disposed in order from the object side to the image side. Following conditions $$0.01<Lp/TD2<0.5 \quad (6)$$

$$0.2<f2/f2a<0.6 \quad (7)$$

are satisfied, where Lp represents an axial distance between a lens surface of the first lens sub-unit closest to the image side and the aperture stop SP, TD2 represents a thickness of the second lens unit L2, f2 represents a focal length of the second lens unit L2, and f2a represents a focal length of the first lens sub-unit.

When the aperture stop SP is disposed as close as possible to the object side, the entrance pupil is located closer to the object side. Therefore, it is preferable in view of reducing the lens diameter of the first lens unit L1. However, when the aperture stop SP is disposed on the object side of the second lens unit L2, it is necessary to provide a large distance between the first lens unit L1 and the second lens unit L2 so as not to interfere with each other in the case where the first lens unit L1 and the second lens unit L2 are close to each other at the telephoto end. When a desirable zoom ratio is to be ensured, the lens diameter of the first lens unit L1 increases, with the result that the size of the zoom lens unit cannot be reduced. On the other hand, when the aperture stop SP is disposed on the image side of the second lens unit L2, it is necessary to ensure a large axial interval between the second lens unit L2 and the third lens unit L3 particularly at the wide angle end. Therefore, the second lens unit L2 should be disposed closer to the object side. At the wide angle end, the first lens unit L1 having the negative refractive power is separated from the second to fourth lens units L2 to L4 having the positive composite refractive power to produce the retrofocus type, thereby ensuring a sufficient back focus. Thus, in view of ensuring the sufficient back focus, it is disadvantageous to locate the second lens unit L2 closer to the object side. When the aperture stop SP is disposed on the image side of the second lens unit L2, a composite refractive power of the partial system closer to the object side than the aperture stop SP becomes weaker, thereby increasing the lens diameter of the first lens unit L1. It is not preferable.

In this embodiment, the aperture stop SP is provided in the second lens unit L2 to realize a reduction in size of the zoom lens unit. In addition, the above-mentioned conditional expressions (6) and (7) are simultaneously satisfied.

The conditional expression (6) specifies a location of the aperture stop SP in the second lens unit L2 and is used to reduce the size of the zoom lens system and to improve the performance thereof.

When Lp/TD2 becomes smaller than a lower limit value in the conditional expression (6) to bring the aperture stop SP close to the first lens sub-unit, the aperture stop SP and the first lens sub-unit may mechanically interfere with each other. Alternatively, because the aperture stop SP is disposed on the object side, a variation in F number upon zooming becomes larger. On the other hand, when Lp/TD2 exceeds an upper limit value in the conditional expression (6) to dispose the aperture stop SP on the image side, the entrance pupil becomes close to the image side. Therefore, in particular, the lens diameter of the first lens unit L1 increases, so that it is hard to correct the distortion. It is not preferable. Note that the upper limit in the conditional expression (6) is more preferably set to 0.35.

The conditional expression (7) relates to a ratio between the focal length of the second lens unit L2 and the focal length of the first lens sub-unit, specifies a refractive power arrangement of the second lens unit L2, and is used for in particular, the improvement of the performance of the zoom lens system-and the reduction in size thereof.

When the ratio becomes smaller than a lower limit value in the conditional expression (7) and thus the refractive power of the first lens sub-unit becomes too weak, in particular, the object side principal point of the second lens unit L2 is located relatively close to the image side and the second lens unit L2 approaches the first lens unit L1 at the telephoto end. Therefore, it is hard to obtain a large magnification and the entire optical length increases at the telephoto end. It is not preferable. On the other hand, when the ratio becomes larger than an upper limit value in the conditional expression (7) and thus the refractive power of the first lens sub-unit becomes too strong, since the object side principal point of the second lens unit L2 is located relatively close to the object side, it is hard to ensure a desirable back focus particularly at the wide angle end. When the second lens unit L2 is located closer to the image side in order to ensure the desirable back focus, it becomes difficult to secure the sufficient amount of movement of the third lens unit L3 relative to the second lens unit L2 upon zooming, thereby reducing an aberration correction effect of the zoom type composed of the four units. It is not preferable. Note that it is more preferable to set the lower limit value in the conditional expression (7) to 0.3. The upper limit value is more preferably set to 0.5.

(D) A condition, $$-0.75<f1/f4<-0.3 \quad (8)$$

is satisfied, where f1 and f4 represent the focal length of the first lens unit L1 and a focal length of the fourth lens unit L4, respectively.

The conditional expression (8) relates to a ratio between the focal length of the first lens unit L1 and the focal length of the fourth lens unit L4, and is appropriately to set a refractive power arrangement, reduce the size of the zoom lens system while ensuring a back focus.

When the ratio becomes smaller than a lower limit value in the conditional expression (8) and thus the refractive power of the first lens unit L1 becomes too weak, it is not preferable that the lens effective diameter of the first lens unit L1 enlarges. On the other hand, when the ratio becomes larger than an upper limit value in the conditional expression (8) and thus the refractive power of the first lens unit L1 becomes too strong, it is not preferable that it is hard to correct the distortion, and to ensure a desirable back focus particularly at the wide angle end. Note that it is more preferable to set the lower limit value in the conditional expression (8) to −0.70. The upper limit value is more preferably set to −0.4.

Next, the numerical embodiments will be described. In the respective numerical embodiments, "i" denotes an order of an optical surface from the object side, R1 denotes a curvature radius of an i-th optical surface (i-th surface), Di denotes an interval between the i-th surface and an (i+1)-th surface, Ni and vi denote a refractive index and an Abbe number of a material of an i-th optical member based on a d-line, respectively. In addition, f denotes a focal length, Fno denotes an F number, and ω denotes a half field angle.

With an optical axis direction being set to an x-axis, a direction perpendicular to the optical axis direction being set to a Y-axis, an aspherical shape is expressed by the following expression, $$x = \frac{(1/R)h^2}{1+\sqrt{\{1-(h/R)^2\}}} + Ah^2 + Bh^4 + Ch^6 + Dh^8 + Eh^{10} + Fh^{12}$$

where R represents a paraxial curvature radius, A, B, C, D, E, and F represent aspherical coefficients. Note that "e-XX" in each of the aspherical coefficients indicates "×10$^{-XX}$".

Table 1 shows correspondences between the conditional expressions and numeral values in the respective numerical embodiments.

(Numerical Embodiment 1)
f = 17.5 to 54.0 Fno = 3.56 to 5.88 2ω = 76.2 to 28.5

| | | | |
|---|---|---|---|
| R1 = 101.424 | D1 = 3.20 | N1 = 1.516330 | ν1 = 64.1 |
| R2 = −1708.614 | D2 = 0.12 | | |
| R3 = 70.694 | D3 = 1.70 | N2 = 1.622992 | ν2 = 58.2 |
| R4 = 14.334 | D4 = 7.56 | | |
| R5 = −380.821 | D5 = 1.30 | N3 = 1.622992 | ν3 = 58.2 |
| R6 = 24.720 | D6 = 0.12 | | |
| R7 = 19.563 | D7 = 3.10 | N4 = 1.846660 | ν4 = 23.9 |
| R8 = 33.246 | D8 = Variable | | |
| R9 = 332.788 | D9 = 1.80 | N5 = 1.516330 | ν5 = 64.1 |
| R10 = Stop | D10 = 0.80 | | |
| R11 = ∞ | D11 = 2.00 | | |
| R12 = 14.953 | D12 = 0.75 | N6 = 1.846660 | ν6 = 23.9 |
| R13 = 11.113 | D13 = 4.50 | N7 = 1.487490 | ν7 = 70.2 |
| R14 = −69.874 | D14 = Variable | | |
| R15 = −34.380 | D15 = 0.70 | N8 = 1.625882 | ν8 = 35.7 |
| R16 = 9.803 | D16 = 2.75 | N9 = 1.740769 | ν9 = 27.8 |
| R17 = 29.860 | D17 = Variable | | |
| R18 = −31.285 | D18 = 1.40 | N10 = 1.583060 | ν10 = 30.2 |
| *R19 = −64.486 | D19 = 0.00 | | |
| R20 = 367.447 | D20 = 4.00 | N11 = 1.516330 | ν11 = 64.1 |
| R21 = −17.469 | | | |

| | Focal length | | |
|---|---|---|---|
| Variable Interval | 17.5 | 29.6 | 54.0 |
| D8 | 31.69 | 13.53 | 2.43 |
| D14 | 1.45 | 3.35 | 6.41 |
| D17 | 6.88 | 4.99 | 1.92 |

Aspherical coefficients
Nineteenth Surface: A=0.00000e+00 B=4.73220e-05
C=3.11152e-07 D=−1.91305e-09 E=7.87010e-12
F=6.04742e-15

(Numerical Embodiment 2)
f = 17.50 to 54.00 Fno = 3.60 to 5.88 2ω = 76.2 to 28.5

| | | | |
|---|---|---|---|
| R1 = 86.274 | D1 = 3.40 | N1 = 1.516330 | ν1 = 64.1 |
| R2 = −7682.997 | D2 = 0.12 | | |
| R3 = 77.724 | D3 = 1.70 | N2 = 1.622992 | ν2 = 58.2 |
| R4 = 13.947 | D4 = 7.78 | | |
| R5 = −260.224 | D5 = 1.30 | N3 = 1.622992 | ν3 = 58.2 |
| R6 = 26.430 | D6 = 0.12 | | |
| R7 = 19.434 | D7 = 3.10 | N4 = 1.846660 | ν4 = 23.9 |
| R8 = 32.860 | D8 = Variable | | |
| R9 = 210.530 | D9 = 1.80 | N5 = 1.517417 | ν5 = 52.4 |

-continued (Numerical Embodiment 2)
f = 17.50 to 54.00 Fno = 3.60 to 5.88 2ω = 76.2 to 28.5

| | | | |
|---|---|---|---|
| R10 = Stop | D10 = 0.50 | | |
| R11 = ∞ | D11 = 1.50 | | |
| R12 = 15.984 | D12 = 0.75 | N6 = 1.846660 | ν6 = 23.9 |
| R13 = 11.295 | D13 = 4.19 | N7 = 1.487490 | ν7 = 70.2 |
| R14 = −55.465 | D14 = Variable | | |
| R15 = −32.125 | D15 = 0.80 | N8 = 1.625882 | ν8 = 35.7 |
| R16 = 10.156 | D16 = 2.75 | N9 = 1.740769 | ν9 = 27.8 |
| R17 = 33.512 | D17 = Variable | | |
| R18 = −33.994 | D18 = 1.40 | N10 = 1.583060 | ν10 = 30.2 |
| *R19 = −54.360 | D19 = 0.33 | | |
| R20 = −216.276 | D20 = 4.10 | N11 = 1.487490 | ν11 = 70.2 |
| R21 = −16.716 | | | |

| | Focal length | | |
|---|---|---|---|
| Variable Interval | 17.50 | 32.05 | 54.00 |
| D8 | 32.79 | 11.95 | 2.58 |
| D14 | 1.71 | 4.76 | 8.19 |
| D17 | 9.08 | 6.03 | 2.60 |

Aspherical coefficients

Nineteenth Surface: A=0.00000e+00 B=4.06236e-05
C=2.98370e-07 D=−3.36327e-09 E=2.36874e-11
F=−3.63866e-14

(Numerical Embodiment 3)
f = 17.50 to 54.00 Fno = 3.60 to 5.88 2ω = 76.2 to 28.5

| | | | |
|---|---|---|---|
| R1 = 85.783 | D1 = 3.60 | N1 = 1.516330 | ν1 = 64.1 |
| R2 = 1466.008 | D2 = 0.12 | | |
| R3 = 63.138 | D3 = 1.70 | N2 = 1.622992 | ν2 = 58.2 |
| R4 = 13.852 | D4 = 8.60 | | |
| R5 = −206.618 | D5 = 1.30 | N3 = 1.622992 | ν3 = 58.2 |
| R6 = 26.703 | D6 = 0.12 | | |
| R7 = 19.567 | D7 = 3.10 | N4 = 1.846660 | ν4 = 23.9 |
| R8 = 31.787 | D8 = Variable | | |
| R9 = 165.349 | D9 = 1.80 | N5 = 1.517417 | ν5 = 52.4 |
| R10 = −32.899 | D10 = 0.50 | | |
| R11 = Stop | D11 = 2.50 | | |
| R12 = 15.758 | D12 = 0.70 | N6 = 1.846660 | ν6 = 23.9 |
| R13 = 11.294 | D13 = 3.96 | N7 = 1.487490 | ν7 = 70.2 |
| R14 = −64.716 | D14 = Variable | | |
| R15 = −32.828 | D15 = 0.80 | N8 = 1.625882 | ν8 = 35.7 |
| R16 = 10.201 | D16 = 2.75 | N9 = 1.740769 | ν9 = 27.8 |
| R17 = 31.933 | D17 = Variable | | |
| R18 = −30.844 | D18 = 1.40 | N10 = 1.583060 | ν10 = 30.2 |
| *R19 = −50.485 | D19 = 0.21 | | |
| R20 = −107.670 | D20 = 4.00 | N11 = 1.516330 | ν11 = 64.1 |
| R21 = −16.361 | | | |

| | Focal length | | |
|---|---|---|---|
| Variable Interval | 17.50 | 31.86 | 54.00 |
| D8 | 32.55 | 12.08 | 2.63 |
| D14 | 1.47 | 4.38 | 7.85 |
| D17 | 8.49 | 5.58 | 2.11 |

Aspherical coefficients

Nineteenth Surface: A=0.00000e+00 B=4.24038e-05
C=3.10416e-07 D=−3.53201e-09 E=2.18966e-11
F=2.40267e-15

(Numerical Embodiment 4)
f = 17.00 to 55.00 Fno = 3.60 to 5.93 2ω = 77.8 to 28.0

| | | | |
|---|---|---|---|
| R1 = 126.356 | D1 = 3.00 | N1 = 1.572501 | ν1 = 57.7 |
| R2 = −1170.869 | D2 = 0.12 | | |
| R3 = 56.283 | D3 = 1.70 | N2 = 1.772499 | ν2 = 49.6 |
| R4 = 14.558 | D4 = 7.56 | | |
| R5 = −284.836 | D5 = 1.30 | N3 = 1.622992 | ν3 = 58.2 |
| R6 = 28.505 | D6 = 0.12 | | |
| R7 = 21.111 | D7 = 3.10 | N4 = 1.846660 | ν4 = 23.9 |
| R8 = 40.664 | D8 = Variable | | |
| R9 = 117.901 | D9 = 1.80 | N5 = 1.517417 | ν5 = 52.4 |
| R10 = Stop | D10 = 1.50 | | |
| R11 = ∞ | D11 = 1.78 | | |
| R12 = 16.224 | D12 = 0.75 | N6 = 1.846660 | ν6 = 23.9 |
| R13 = 11.529 | D13 = 4.50 | N7 = 1.487490 | ν7 = 70.2 |
| R14 = −55.123 | D14 = Variable | | |
| R15 = −30.227 | D15 = 0.80 | N8 = 1.625882 | ν8 = 35.7 |
| R16 = 10.770 | D16 = 2.72 | N9 = 1.761821 | ν9 = 26.5 |
| R17 = 28.299 | D17 = Variable | | |
| R18 = −31.077 | D18 = 1.40 | N10 = 1.688931 | ν10 = 31.1 |
| *R19 = −51.613 | D19 = 0.62 | | |
| R20 = −125.272 | D20 = 4.10 | N11 = 1.487490 | ν11 = 70.2 |
| R21 = −14.837 | | | |

| | Focal length | | |
|---|---|---|---|
| Variable Interval | 17.00 | 31.50 | 55.00 |
| D8 | 36.32 | 13.20 | 2.52 |
| D14 | 2.03 | 4.76 | 8.45 |
| D17 | 7.46 | 4.73 | 1.03 |

Aspherical coefficients
Nineteenth Surface: A=0.00000e+00 B=4.09809e-05
C=2.36138e-07 D=−1.69273e-09 E=−1.30716e-12
F=5.94664e-14

(Numerical Embodiment 5)
f = 18.00 to 55.00 Fno = 3.59 to 5.99 2ω = 74.6 to 28.0

| | | | |
|---|---|---|---|
| R1 = 93.970 | D1 = 3.20 | N1 = 1.516330 | ν1 = 64.1 |
| R2 = −184142.483 | D2 = 0.12 | | |
| R3 = 66.571 | D3 = 1.60 | N2 = 1.622992 | ν2 = 58.2 |
| R4 = 14.044 | D4 = 7.82 | | |
| R5 = −186.656 | D5 = 1.20 | N3 = 1.622992 | ν3 = 58.2 |
| R6 = 27.091 | D6 = 0.12 | | |
| R7 = 20.119 | D7 = 2.90 | N4 = 1.846660 | ν4 = 23.9 |
| R8 = 35.644 | D8 = Variable | | |
| R9 = 131.721 | D9 = 1.70 | N5 = 1.572501 | ν5 = 57.8 |

-continued (Numerical Embodiment 5)
f = 18.00 to 55.00 Fno = 3.59 to 5.99 2ω = 74.6 to 28.0

| | | | |
|---|---|---|---|
| R10 = Stop | D10 = 2.90 | | |
| R11 = ∞ | D11 = 2.50 | | |
| R12 = 16.312 | D12 = 0.80 | N6 = 1.846660 | ν6 = 23.9 |
| R13 = 11.532 | D13 = 4.75 | N7 = 1.487490 | ν7 = 70.2 |
| R14 = −57.613 | D14 = Variable | | |
| R15 = −33.004 | D15 = 0.80 | N8 = 1.620041 | ν8 = 36.3 |
| R16 = 11.180 | D16 = 3.20 | N9 = 1.755199 | ν9 = 27.5 |
| R17 = 27.194 | D17 = Variable | | |
| R18 = −140.794 | D18 = 1.50 | N10 = 1.583060 | ν10 = 30.2 |
| R19 = −144.846 | D19 = 0.12 | | |
| R20 = −664.185 | D20 = 4.16 | N11 = 1.516330 | ν11 = 64.1 |
| R21 = −19.869 | | | |

| | Focal length | | |
|---|---|---|---|
| Variable Interval | 18.00 | 31.74 | 55.00 |
| D8 | 32.31 | 12.13 | 2.05 |
| D14 | 1.62 | 4.33 | 7.91 |
| D17 | 7.72 | 5.02 | 1.44 |

Aspherical coefficients
Nineteenth Surface: A=0.00000e+00 B=2.76705e-05
C=1.09618e-07 D=2.25895e-11 E=−1.44537e-11
F=1.26393e-13

TABLE 1

| Conditional Expression | Numerical Embodiment 1 | Numerical Embodiment 2 | Numerical Embodiment 3 | Numerical Embodiment 4 | Numerical Embodiment 5 |
|---|---|---|---|---|---|
| (1) ft/fw | 3.09 | 3.09 | 3.09 | 3.24 | 3.06 |
| (2) bfw/H | 2.50 | 2.50 | 2.53 | 2.50 | 2.51 |
| (3) TDw/fw | 4.33 | 4.53 | 4.55 | 4.86 | 4.50 |
| (4) R1/R2 | −0.06 | −0.01 | 0.06 | −0.11 | 0.00 |
| (5) (f1/ft)$^2$ | 0.22 | 0.22 | 0.21 | 0.22 | 0.23 |
| (6) Lp/TD2 | 0.08 | 0.06 | 0.05 | 0.15 | 0.23 |
| (7) f2/f2a | 0.35 | 0.37 | 0.41 | 0.41 | 0.40 |
| (8) f1/f4 | −0.58 | −0.55 | −0.52 | −0.57 | −0.66 |

According to the embodiments as described above, a zoom lens system can be realized in which the entire lens system has a small size, high optical performance is obtained, the number of lenses is small, and a structure is simple. In particular, a zoom lens can be realized in which a reduction in optical performance resulting from a manufacturing error such as a displacement in axis of each lens is small.

Next, an embodiment in which the zoom lens system of the present invention is applied to an image pickup device will be described with reference to FIG. 16.

Figure 16:
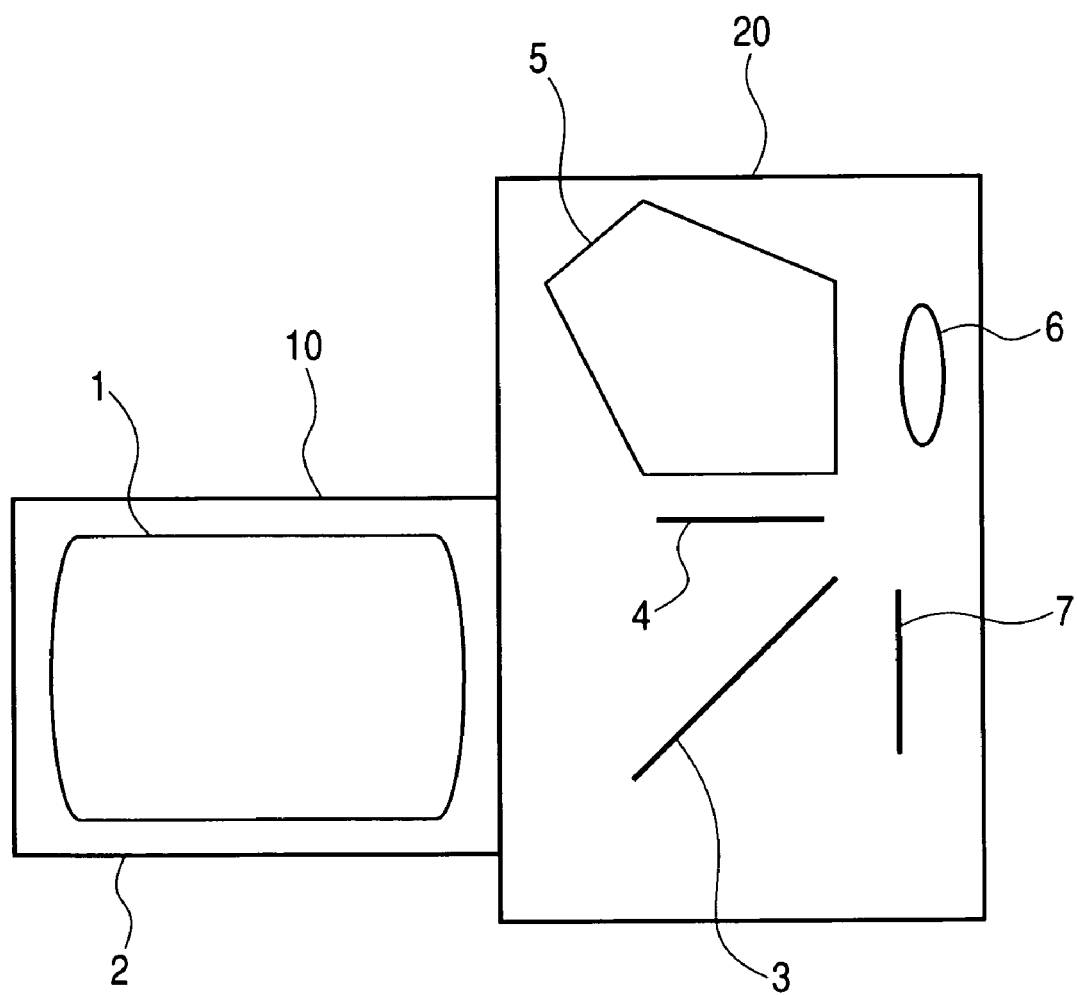
FIG. 16 is a main part schematic view showing a single-lens reflex camera.

FIG. 16 is a main part schematic view showing a single-lens reflex camera. In FIG. 16, reference numeral 10 denotes an image pickup lens having a zoom lens 1 according to Numerical Embodiments 1 to 5 of the present invention. The zoom lens 1 is held in a lens barrel 2 serving as a holding member. A camera main body 20 includes: a quick return mirror 3 for reflecting a light flux from the image pickup lens 10 upward; a focal plate 4 disposed at an image forming position of the image pickup lens 10; a pentagonal roof prism 5 for converting an reverse image formed on the focal plate 4 into an erect image; and an eyepiece lens 6 for observing the erect image. Reference numeral 7 denotes a film surface. In image pickup, the quick return mirror 3 is removed from an optical axis and an image is formed on the film surface 7 by the image pickup lens 10.

The zoom lens system of the present invention is suitable for an interchangeable lens for the single-lens reflex camera as shown in FIG. 16.

This application claims priority from Japanese Patent Application No. 2003-328074 filed Sep. 19, 2003, which is hereby incorporated by reference herein.

What is claimed is:

1. A zoom lens system, comprising, in order from an object side to an image side:
   a first lens unit having a negative optical power;
   a second lens unit having a positive optical power;
   a third lens unit having a negative optical power; and
   a fourth lens unit having a positive optical power,
   wherein during zooming, an interval between the first lens unit and the second lens unit at a telephoto end is smaller than that at a wide angle end, an interval between the second lens unit and the third lens unit at the telephoto end is larger than that at the wide angle end, and an interval between the third lens unit and the fourth lens unit at the telephoto end is smaller than that at the wide angle end, and
   wherein following conditions are satisfied, 2.5<ft/fw<4.0 and 2.2<bfw/H<3.0, where fw and ft represent a focal length of an entire system at the wide angle end and that at the telephoto end, respectively, bfw represents a back focus at the wide angle end, and H represents a maximum image height,
   wherein the first lens unit comprises a positive lens element located closest to the object side, and wherein following condition is satisfied, −0.3<R1/R2<0.3, where R1 represents a curvature radius of an object side lens surface of the positive lens element, and R2 represents a curvature radius of an image side lens surface of the positive lens element.

2. A zoom lens system according to claim 1, wherein the first lens unit moves during focusing, and wherein a condition is satisfied, $0.1 < (f1/ft)^2 < 0.5$, where f1 represents a focal length of the first lens unit.

3. A zoom lens system according to claim 1, wherein the second lens unit consists of a first lens sub-unit having a positive optical power, an aperture stop, and a second lens sub-unit having a positive optical power in order from the object side to the image side, and wherein the following conditions are satisfied, 0.01<Lp/TD2<0.5 and 0.2<f2/f2a<0.6, where Lp represents a distance between a lens surface of the first lens sub-unit closest to the image side and the aperture stop, TD2 represents a thickness of the second lens unit on an optical axis, f2 represents a focal length of the second lens unit, and f2a represents a focal length of the first lens sub-unit.

4. A zoom lens system according to claim 1, wherein a condition, −0.75<f1/f4<−0.3, is satisfied, where f1 and f4 represent the focal length of the first lens unit and a focal length of the fourth lens unit, respectively.

5. A zoom lens system according to claim 1, wherein the zoom lens system forms an image on a photosensitive surface of a photoelectric transducer.

6. An image pickup device, comprising: the zoom lens system according to claim 1; and a photoelectric transducer for receiving an image formed by the zoom lens system.

7. A zoom lens system, comprising, in order from an object side to an image side:
   a first lens unit having a negative optical power;
   a second lens unit having a positive optical power;
   a third lens unit having a negative optical power; and
   a fourth lens unit having a positive optical power,
   wherein during zooming, an interval between the first lens unit and the second lens unit at a telephoto end is smaller than that at a wide angle end, an interval between the second lens unit and the third lens unit at the telephoto end is larger than that at the wide angle end, and an interval between the third lens unit and the fourth lens unit at the telephoto end is smaller than that at the wide angle end, and wherein following conditions are satisfied, 2.5<ft/fw<4.0 and 4.1<TDw/fw<5.0, where fw and ft represent a focal length of an entire system at the wide angle end and that at the telephoto end, respectively, and TDw represents an axial distance between a lens surface closest to the object side of the entire system and a lens surface closest to the image side of the entire system at the wide angle end,
   wherein the first lens unit comprises a positive lens element located closest to the object side, and wherein a condition −0.3<R1/R2<0.3, is satisfied, where R1 represents a curvature radius of an object side lens surface of the positive lens element and R2 represents a curvature radius of an image side lens surface of the positive lens element.

8. A zoom lens system according to claim 7, wherein the first lens unit moves during focusing, and wherein a condition $0.1 < (f1/ft)^2 < 0.5$, is satisfied, where f1 represents a focal length of the first lens unit.

9. A zoom lens system according to claim 7, wherein the second lens unit consists of a first lens sub-unit having a positive optical power, an aperture stop, and a second lens sub-unit having a positive optical power in order from the object side to the image side, and wherein the following conditions are satisfied, 0.01<Lp/TD2<0.5 and 0.2<f2/f2a<0.6, where Lp represents a distance between a lens surface of the first lens sub-unit closest to the image side and the aperture stop, TD2 represents a thickness of the second lens unit on an optical axis, f2 represents a focal length of the second lens unit, and f2a represents a focal length of the first lens sub-unit.

10. A zoom lens system according to claim 7, wherein a condition, −0.75<f1/f4<−0.3, is satisfied, where f1 and f4 represent the focal length of the first lens unit and a focal length of the fourth lens unit, respectively.

11. A zoom lens system according to claim 7, wherein the zoom lens system forms an image on a photosensitive surface of a photoelectric transducer.

12. An image pickup device, comprising: the zoom lens system according to claim 7; and a photoelectric transducer for receiving an image formed by the zoom lens system.

13. A zoom lens system, comprising, in order from an object side to an image side:
   a first lens unit having a negative optical power;
   a second lens unit having a positive optical power;
   a third lens unit having a negative optical power; and a fourth lens unit having a positive optical power, wherein during zooming, an interval between the first lens unit and the second lens unit at a telephoto end is smaller than that at a wide angle end, an interval between the second lens unit and the third lens unit at the telephoto end is larger than that at the wide angle end, and an interval between the third lens unit and the fourth lens unit at the telephoto end is smaller than that at the wide angle end, and wherein following conditions are satisfied, $2.5 < ft/fw < 4.0$ and $2.2 < bfw/H < 3.0$, where fw and ft represent a focal length of an entire system at the wide angle end and that at the telephoto end, respectively, bfw represents a back focus at the wide angle end, and H represents a maximum image height, wherein the second lens unit consists of a first lens sub-unit having a positive optical power, an aperture stop, and a second lens sub-unit having a positive optical power in order from the object side to the image side, and wherein following conditions are satisfied, $0.01 < Lp/TD2 < 0.5$ and $0.2 < f2/f2a < 0.6$, where Lp represents a distance between a lens surface of the first lens sub-unit closest to the image side and the aperture stop, TD2 represents a thickness of the second lens unit on an optical axis, f2 represents a focal length of the second lens unit L2, and f2a represents a focal length of the first lens sub-unit.

14. A zoom lens system, comprising, in order from an object side to an image side:

a first lens unit having a negative optical power;

a second lens unit having a positive optical power;

a third lens unit having a negative optical power; and a fourth lens unit having a positive optical power, wherein during zooming, an interval between the first lens unit and the second lens unit at a telephoto end is smaller than that at a wide angle end, an interval between the second lens unit and the third lens unit at the telephoto end is larger than that at the wide angle end, and an interval between the third lens unit and the fourth lens unit at the telephoto end is smaller than that at the wide angle end, and wherein following conditions are satisfied, $2.5 < ft/fw < 4.0$ and $4.1 < TDw/fw < 5.0$, where fw and ft represent a focal length of an entire system at the wide angle end and that at the telephoto end, respectively, and TDw represents an axial distance between a lens surface closest to the object side of the entire system and a lens surface closest to the image side of the entire system at the wide angle end, wherein the second lens unit consists of a first lens sub-unit having a positive optical power, an aperture stop, and a second lens sub-unit having a positive optical power in order from the object side to the image side, and wherein following conditions are satisfied, $0.01 < Lp/TD2 < 0.5$ and $0.2 < f2/f2a < 0.6$, where Lp represents a distance between a lens surface of the first lens sub-unit closest to the image side and the aperture stop, TD2 represents a thickness of the second lens unit on an optical axis, f2 represents a focal length of the second lens unit L2, and f2a represents a focal length of the first lens sub-unit.

* * * * *

UNITED STATES PATENT AND TRADEMARK OFFICE
CERTIFICATE OF CORRECTION

PATENT NO. : 7,102,829 B2
APPLICATION NO. : 10/942636
DATED : September 5, 2006
INVENTOR(S) : Takeshi Nishimura It is certified that error appears in the above-identified patent and that said Letters Patent is hereby corrected as shown below:

(Col. 13, line 58), please replace "the following" with --following--; and (Col. 13, line 64), please replace "unit," with --unit $L_2$,--.

Signed and Sealed this

Fourteenth Day of November, 2006

JON W. DUDAS
*Director of the United States Patent and Trademark Office*